H. V. WILLE.

STAY BOLT.

APPLICATION FILED NOV. 2, 1915.

Reissued Dec. 21, 1915. 14,036.

Inventor-
Henry V. Wille,
by his Attorneys-
Howson & Howson

COLUMBIA PLANOGRAPH CO., WASHINGTON, D. C.

UNITED STATES PATENT OFFICE.

HENRY V. WILLE, OF PHILADELPHIA, PENNSYLVANIA, ASSIGNOR TO THE BALDWIN LOCOMOTIVE WORKS, OF PHILADELPHIA, PENNSYLVANIA, A CORPORATION OF PENNSYLVANIA.

STAY-BOLT.

14,036. Specification of Reissued Letters Patent. Reissued Dec. 21, 1915.

Original No. 1,154,468, dated September 21, 1915, Serial No. 860,214. Application for reissue filed November 2, 1915. Serial No. 59,324.

*To all whom it may concern:*

Be it known that I, HENRY V. WILLE, a citizen of the United States, and a resident of Philadelphia, county of Philadelphia, State of Pennsylvania, have invented certain Improvements in Stay-Bolts, of which the following is a specification.

The object of my invention is to provide a stay bolt for boilers and other containers, which will have a threaded section at one end adapted to the threaded opening in the inner sheet of the boiler, and which is rigidly and directly secured to the outer sheet without the use of a screw thread, which is ordinarily located in the space between the two sheets. This object I accomplish by forming a seat in the inner wall of the outer sheet and allowing the bolt to be seated therein and to be secured so that it will always be held against the seat, thus, when the inner sheet moves laterally independently of the outer sheet, the bending moment will be at the seat where the bolt rests against the outer sheet. Where a screw thread is used the bending of the bolt is liable to form a fracture at the screw thread and this is especially so when the bolts are made of steel. It is now the universal practice to make these bolts of iron, but, by my invention, they can be made either of iron or steel and the bolt will not fracture at the outer plate.

Figure 1:
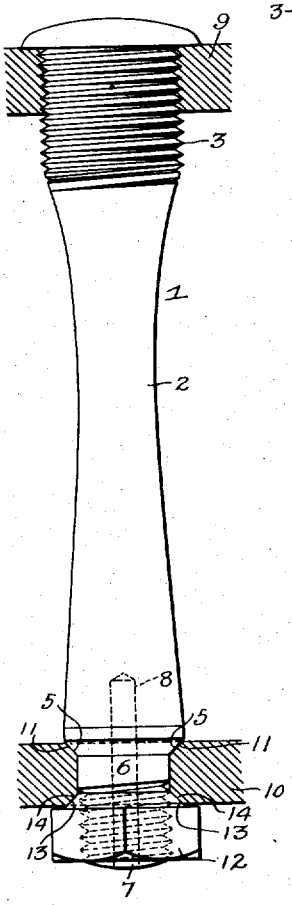
Figure 2:
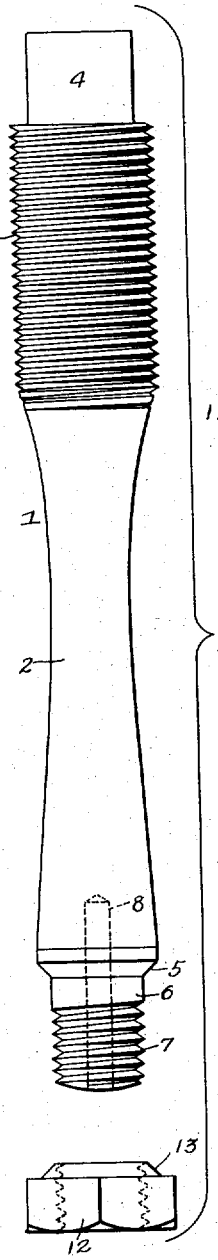
Figure 3:
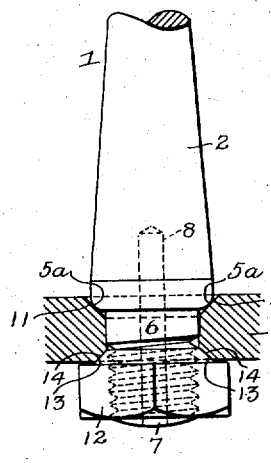
Figure 4:
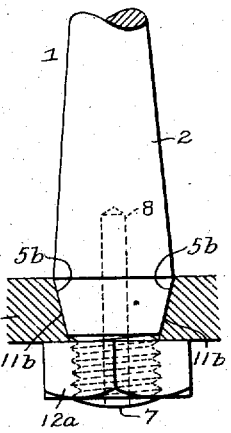
Figure 5:
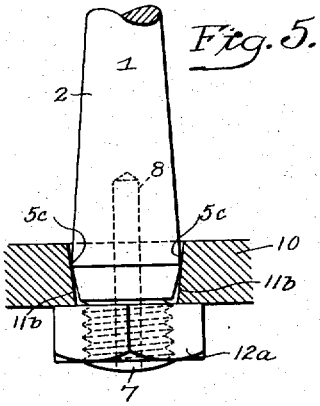

In the accompanying drawing:—Figure 1, is a side view of a stay bolt, showing it in position in the two plates of a boiler; Fig. 2, is a detached view of the bolt prior to its application to the boiler; Fig. 3, is a view illustrating a modification of the joint between the bolt and one of the plates; and Figs. 4 and 5, are views of other modifications illustrating the invention.

Referring in the first instance to Figs. 1 and 2, 1 is the stay bolt of the form having a body portion 2, a threaded portion 3 at one end, and beyond this threaded portion a squared or otherwise shaped head 4 by which the bolt is screwed into the plate. At the opposite end of the bolt is a beveled seat portion 5 and a reduced portion 6, terminating in a threaded end 7. The bolt has the usual telltale opening 8 at its end so that in case of a fracture it will be immediately detected.

9 is the inner plate of a boiler and 10 is the outer plate. The inner plate has a threaded opening, the threads of which mesh with the threads of the threaded portion 3 of the stay bolt. The plate 10 has a beveled seat 11 for the seat section 5 of the bolt and has an opening therethrough in which fits the portion 6 of the bolt. The threaded end 7 extends beyond the plate when the stay bolt is in position, as clearly shown in Fig. 1.

12 is a nut adapted to the threaded end 7 and this nut, in the present instance, has a beveled projecting portion 13 which fits against the beveled seat 14 formed in the plate 10. The body portion of the bolt is shaped as shown in the drawing so as to allow it to have the necessary elasticity. The joint formed by the bolt and nut bearing against the two seats 11 and 14 in the plate 10 is steam tight, yet it has sufficient flexibility to accommodate the movement of the bolt in the plate, due to the different temperatures to which the boiler is subjected.

The diameter of the portions 5 and 6 of the stay bolt is such that it will readily pass through the opening in the plate 9 and, after the stay bolt has passed through this opening and through the opening in the plate 10 and the nut applied, the projecting portion, including the head 4, is cut off at a point beyond the plate 9 and the balance of the projecting portion is riveted over said plate 9, as clearly shown in Fig. 1, making the joint at this end rigid and substantially steam tight.

In Fig. 3, I have illustrated a form in which the portion $5^a$ of the bolt is rounded and is adapted to fit the beveled seat 11 in the plate 10, giving a line bearing instead of the full tapered bearing illustrated in Fig. 1.

In Fig. 4, I have illustrated another form of coupling in which the portion $5^b$ is extended the full thickness of the plate and the beveled seat $11^b$ corresponds, and, in this instance, a plain nut $12^a$ is used instead of one having the extension 13.

In Fig. 5, I have illustrated the plate having the bevel $11^b$ and the bolt has a comparatively sharp shoulder $5^c$ which bears against the beveled portion $11^b$ of the plate and forms a steam tight joint. In this instance the nut $12^a$ is plain.

It will be seen by the above construction that, when the stay bolt is in place and the nut 12 is drawn tightly in position so as to bring the stay bolt against the plate 10, the joint is steam tight but will be more flexible than when the stay bolt is screwed into the sheet and riveted over as is now universally done. The sharp edge $5^e$ in the form of a bolt illustrated in Fig. 5, not only makes a steam tight joint, but also provides a knife edge upon which a slight vibration can take place.

The general shape of the body portion 2 of the bolt is such that it has an approximately uniform bending moment in flexure, and the fiber stress in flexure will be uniform from the outside sheet to the center of the bolt and the other half of the bolt is practically a duplicate of the outside half.

I claim:—

1. The combination of an inner and an outer plate of a boiler, the inner plate having a threaded opening and the outer plate having a plain opening and having a seat surrounding said latter opening; a stay bolt having a thread at one end adapted to the threaded opening in the inner plate and having a seat portion at the opposite end arranged to bear against the seat of the outer plate and having an extension beyond the seat extending through the plain opening; and means, independent of the plate, for holding the bolt to its seat.

2. The combination of an inner and an outer plate of a boiler, or other container, the inner plate having a threaded opening, the outer plate having a plain opening; a beveled seat surrounding the opening; a stay bolt having a threaded portion at one end adapted to the threaded opening of the inner plate and having a seat portion at the opposite end; a reduced threaded portion beyond the seat extending through the plain opening in the outer plate; and a nut, on the outside of the outer plate, mounted on the reduced threaded portion of the bolt.

3. The combination of an inner and an outer plate of a boiler, or other container, the inner plate having a threaded opening, the outer plate having a plain opening and having one beveled seat on the inner side and another beveled seat on the outer side, both surrounding said plain opening; a stay bolt having a threaded portion at one end adapted to the threaded opening in the inner plate and having a beveled seat adapted to the inner beveled seat of the outer plate and having a reduced portion extending through the plain opening; and a nut mounted on the reduced threaded portion and having a beveled projection adapted to the beveled seat on the outer surface of the outer plate.

4. A stay bolt having a threaded portion at one end of a given diameter and having a reduced body portion and an enlarged portion at the other end less in diameter than the threaded portion so as to pass through the threaded hole in the plate in which the threaded portion is to be mounted, said enlarged portion having a seat section; and a reduced threaded portion beyond the seat section arranged to receive a nut for confining one end of the bolt to a plate

HENRY V. WILLE

Copies of this patent may be obtained for five cents each, by addressing the "Commissioner of Patents. Washington, D. C."